United States Patent [19]

Hirashima

[11] 3,745,241

[45] July 10, 1973

[54] TELEVISION RECEIVER FOR SEPARATING AND REPRODUCING MULTIPLEXED VIDEO SIGNALS

[75] Inventor: Masayoshi Hirashima, Takatsuki-shi, Japan

[73] Assignee: Matsushita Electric Industrial Co., Ltd., Osaka, Japan

[22] Filed: Mar. 30, 1971

[21] Appl. No.: 129,345

[30] Foreign Application Priority Data

Apr. 8, 1970 Japan .............................. 45/30266

[52] U.S. Cl. ....................... 178/5.8 R, 178/DIG. 23

[51] Int. Cl. ............................................ H04n 7/08

[58] Field of Search ...................... 178/5.6, 5.8, 6.5, 178/6.8, DIG. 23

[56] References Cited

UNITED STATES PATENTS

| | | | |
|---|---|---|---|
| 2,696,523 | 12/1954 | Theile | 178/6.5 |
| 3,358,079 | 12/1967 | Banning | 178/6.5 |
| 3,488,435 | 1/1970 | Eilenberger | 178/5.6 |
| 3,562,421 | 2/1971 | Moskouitz | 178/6.8 |

*Primary Examiner*—Richard Murray
*Attorney*—Stevens, Davis, Miller & Mosher

[57] ABSTRACT

A television receiver in which a television signal containing two different kinds of video signals for every other scanning period is received, and the two different kinds of video signals are picked up separately from the received signal and displayed as different images on two different picture tubes.

7 Claims, 20 Drawing Figures

M. HIRASHIMA
INVENTOR

BY Stevens, Davis, Miller & Mosher
ATTORNEYS

TELEVISION RECEIVER FOR SEPARATING AND REPRODUCING MULTIPLEXED VIDEO SIGNALS

The present invention relates to a television receiver. An object of the present invention is to provide a television receiver having two picture tubes each independently displaying one of two video signals transmitted by means of a single television wave.

The above and other objects, features and advantages will be made apparent by the detailed description taken in conjunction with the accompanying drawings, in which.

Figure 3:
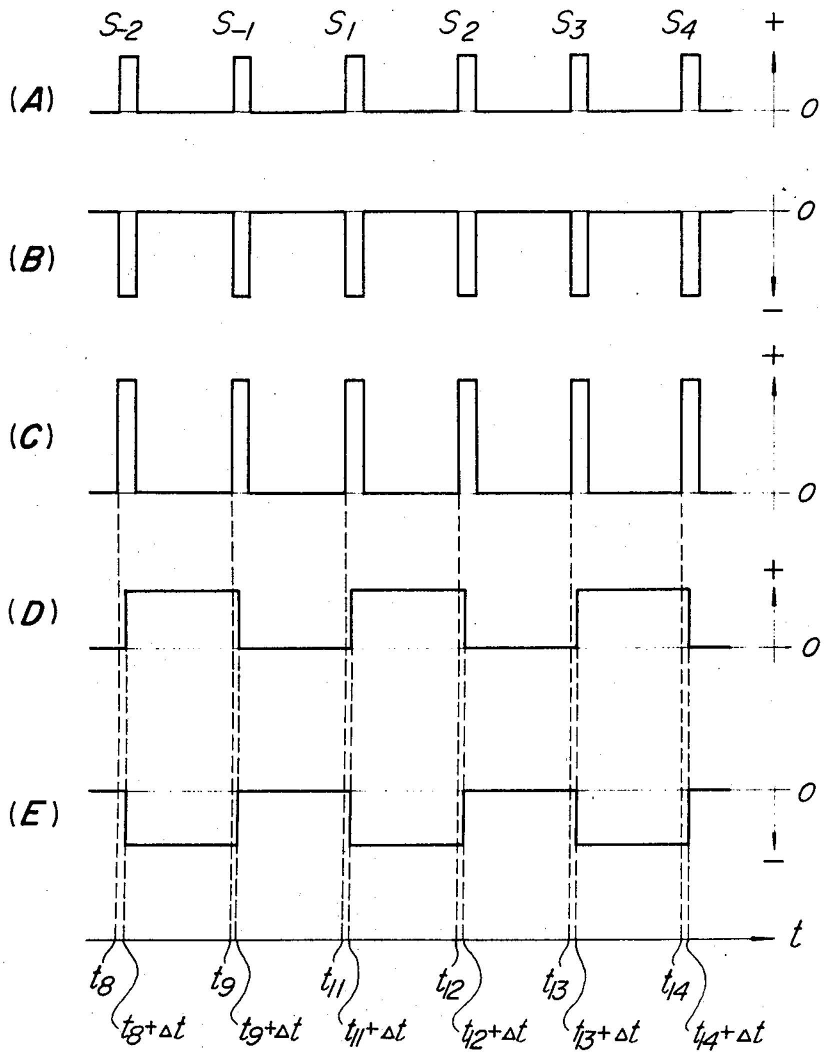
Figure 4:
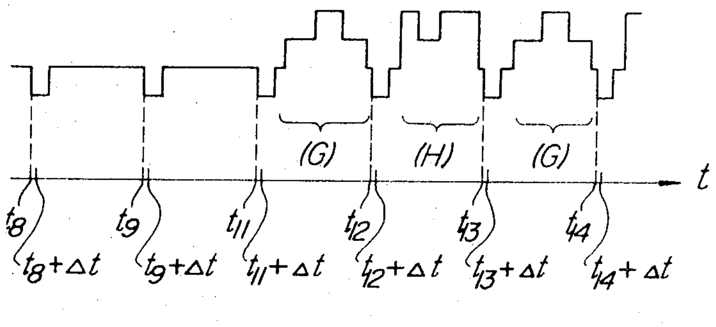
Figure 5A:
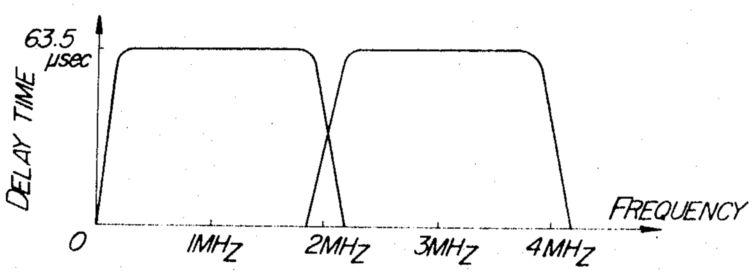
Figure 5B:
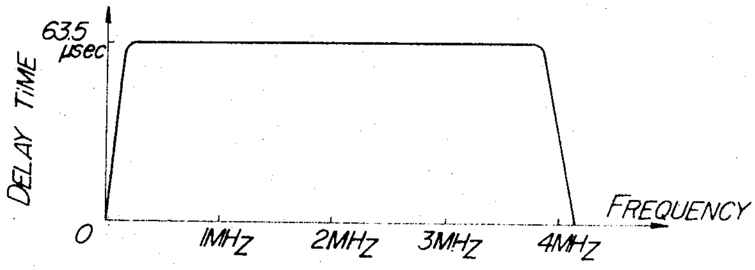
Figure 6:
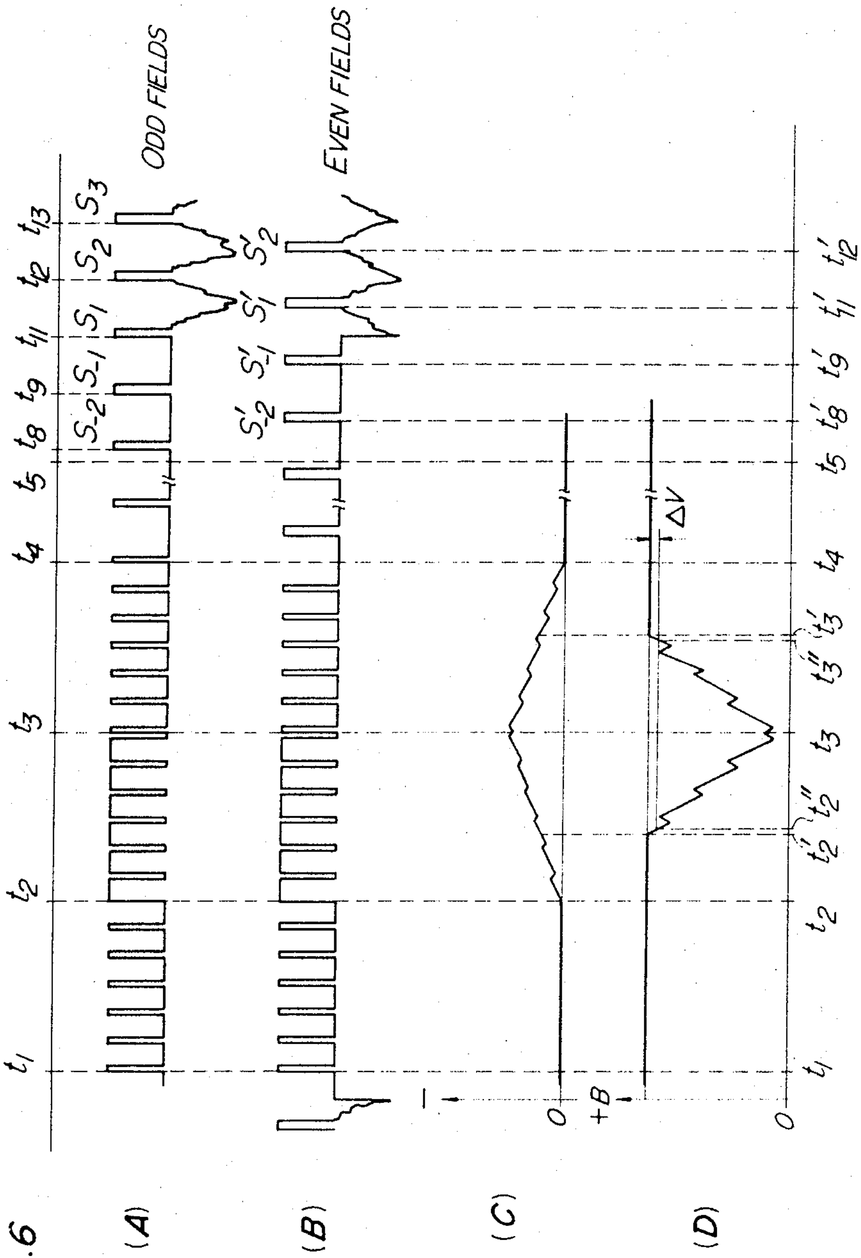
Figure 7:
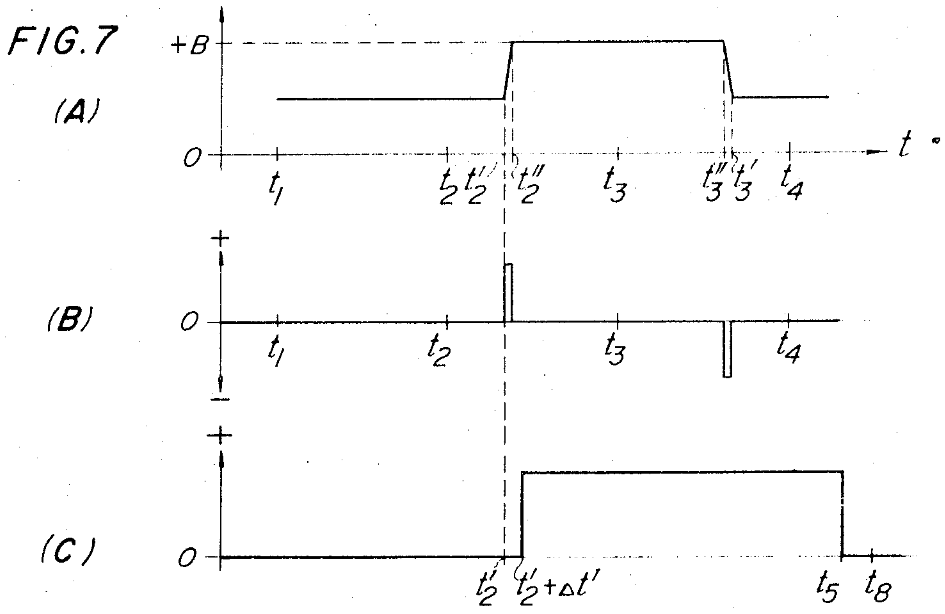
Figure 8:
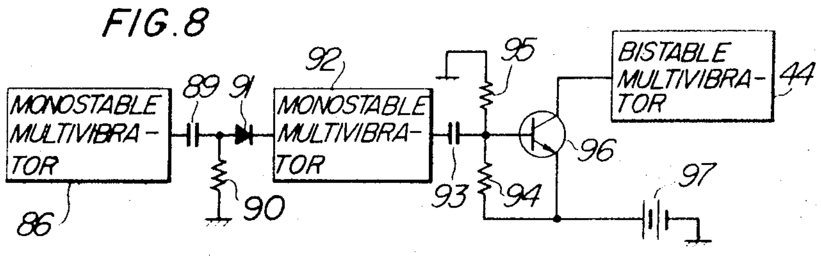

FIG. 3 (A), (B), (C), (D) and (E) show waveforms for explaining the television receiver;

FIG. 4 also shows a waveform for explaining the television receiver;

FIGS. 5*a* and 5*b* show characteristic diagrams for explaining the television receiver;

FIG. 6 (A), (B), (C) and (D) and FIG. 7 (A), (B) and (C) show waveforms for explaining the television receiver;

FIG. 8 is a circuit diagram showing a part of the television receiver; and

Figure 9:
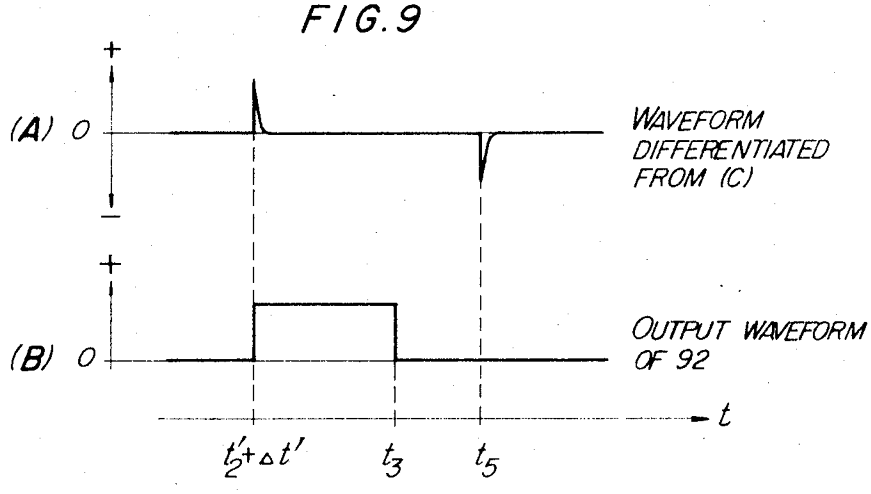

FIG. 9 (A) and (B) show waveforms for explaining the circuit of FIG. 8.

Figure 1:
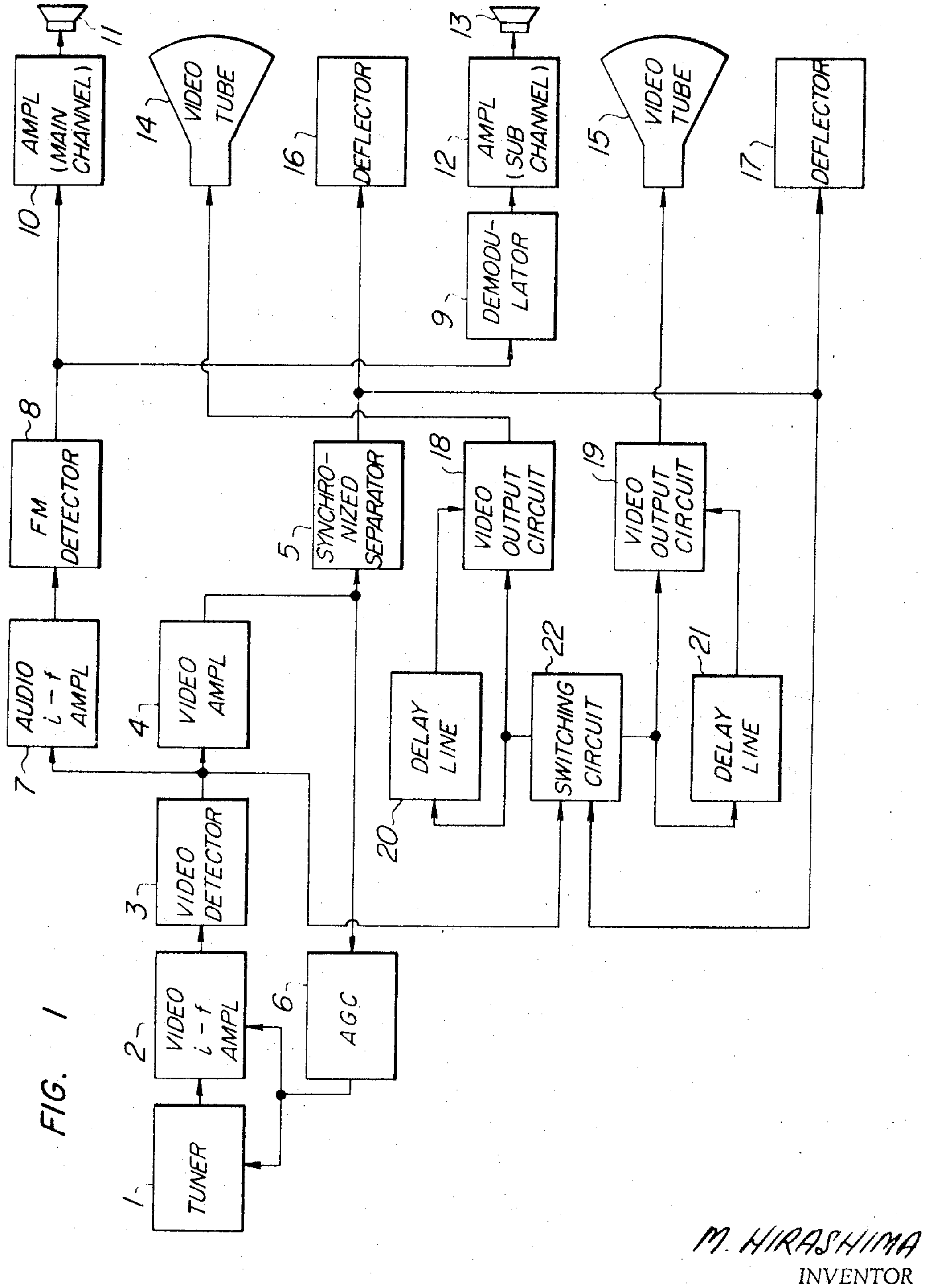
FIG. 1 is a block diagram showing the principle of the television receiver according to the present invention.

Referring to FIG. 1, numeral 1 shows a tuner, numeral 2 a video intermediate frequency amplifier circuit, numeral 3 a video detector circuit, and numeral 4 a video amplifier circuit, a bias for which is so selected as not to distort a synchronizing signal. Numeral 5 shows a synchronized separator circuit, numeral 6 an AGC circuit, numeral 7 an audio intermediate frequency amplifier circuit, and numeral 8 an FM detector circuit. All of the elements from numeral 1 to 3 and from 5 to 8 are circuits similar to those of an ordinary television receiver. Where there are two kinds of signals transmitted in one channel, one is called a main channel and the other a sub channel. Audio signals in the main channel are transmitted by means of an ordinary audio carrier wave, while audio signals in the sub channel are transmitted by means of an audio sub carrier of 31.5 KHz. The processes of transmitting and receiving the multiplexed audio signals are employed in actual broadcasting and are well known receivers therefor being available on the market. Therefore explanation of them will be omitted. Video signals of the main and sub channels are transmitted alternately for each horizontal scanning period, while synchronizing signals with the same phase and amplitude are transmitted for both of the channels. Numeral 9 shows a demodulator of an audio sub carrier, numeral 10 an audio amplifier and output circuit for the main channel, numeral 11 a speaker for the main channel, numeral 12 an audio amplifier and output circuit for the sub channel, numeral 13 a speaker for the sub channel, numeral 14 a video tube for the main channel, numeral 15 a video tube for the sub channel, numeral 16 a deflector circuit for the main channel, numeral 17 a deflector circuit for the sub channel, numeral 18 a video output circuit for the main channel, numeral 19 a video output circuit for the sub channel, numeral 20 a delay line for the main channel, and numeral 21 a delay line for the sub channel. Numeral 22 shows a circuit for switching the operations of the video output circuit 18 for the main channel and the video output circuit 19 for the sub channel depending on whether signals are transmitted through the main or sub channel.

Figure 2:
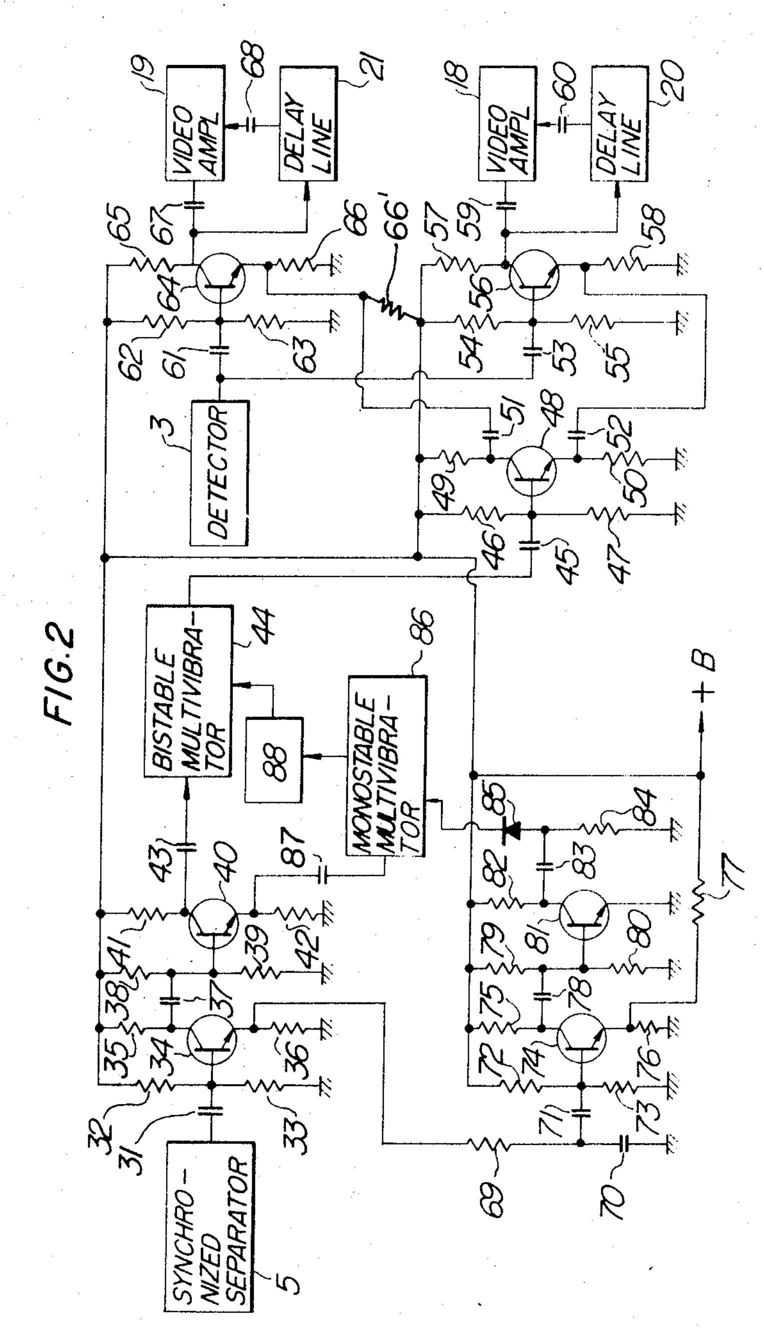
FIG. 2 is a diagram showing an actual circuit of the essential parts of the television receiver.

In the case where a video signal is sent through the main channel, the output of the bistable multivibrator 44 triggered by a synchronizing signal $S_1$ during the period from time $t_{11}+\Delta t$ to $t_{12}+\Delta t$ in FIGS. 2 and 3 causes the signal of the main channel to be passed to the video amplifier circuit 18 and delay line 20 of the main channel. During the period from $t_{12}+\Delta t$ to $t_{13}+\Delta t$, no signal is applied to the video amplifier circuit 18, but the portion of the video signal corresponding to the period from $t_{11}+\Delta t$ to $t_{12}+\Delta t$ is again applied to the video amplifier circuit 18 with a time delay of one horizontal scanning period (63.5 $\mu$ sec in the Japanese and U.S. systems) due to the delay line. In other words, the same input is applied to the main channel during a horizontal scanning period as during the next horizontal scanning period.

As regards the sub channel, this situation is reversed. A video signal of the sub channel is applied to the video amplifier circuit 19 during the period from $t_{12}+\Delta t$ to $t_{13}+\Delta t$ and a signal delayed by one scanning period (63.5 $\mu$ sec) is applied to the video amplifier circuit 19 during the next period from $t_{13}+\Delta t$ to $t_{14}+\Delta t$. It will be seen from the above description that in spite of its resolution being about one half of the conventional system now in use in Japan and U.S., the device according to the invention will find application in educational television for transmitting and receiving characters and figures.

The construction and principle of the switching circuit 22 of FIG. 1 will be now explained in detail with reference to FIG. 2. Numeral 31 shows a coupling capacitor for applying a positive synchronizing signal (containing no video signal) with a waveform shown by FIG. 3 (A) to the base of the transistor 34. Numerals 32 and 33 show resistors for applying a bias to the base of the transistor 34, and numeral 35 a resistor for feeding the collector of the transistor 34 and constituting a part of a load resistance. Numeral 36 shows an emitter resistor for providing AC and DC negative feedback. The transistor 34 performs class A amplification. A waveform such as is shown by FIG. 3 (B) appears at the collector of the transistor 34. This waveform is applied through the capacitor 37 to the base of transistor 40. Numerals 38 and 39 show resistors for applying a bias to the base of the transistor 40 and numeral 41 a resistor for feeding the collector of the transistor 40 and for constituting part of a load resistance. Numeral 42 shows an emitter resistance for providing AC and DC negative feedback. The transistor 40 performs class A amplification, so that an amplified synchronizing signal as shown by FIG. 3 (C) in phase with the signal shown in FIG. 3 (A) is produced at the collector of the transistor 40. When this synchronizing signal is used to trigger the bistable multivibrator 44 through the capacitor 43, an output waveform such as is shown by FIG. 3 (D) is obtained. Generally, the rise time of the output of a bistable multivibrator is delayed by $\Delta t$ behind the start of a trigger pulse, but, as will be clear from FIG. 3, it is easy to make $\Delta t$ smaller than the 5 $\mu$ sec duration of the synchronizing signal. The output waveform FIG. 3 (D) derived from the bistable multivibrator 44 is applied through the capacitor 45 to the base of the transistor 48. Numerals 46 and 47 show resistors for applying a bias voltage to the base of the transistor 48, and numerals 49 and 50 collector and emitter resistances for the transistor 48 respectively. Numerals 51 and 52 show capacitors for applying to the emitters of the transistors 64 and 56 output waveforms produced at the collector and emitter of the transistor 48, the resistance values of the resistors 49 and 50 being so determined that the emitter and collector outputs of the transistor 48 are equal to each other. Since the resistor 66 is connected in parallel with the resistor 49 and resistor 58 with the resistor 50 through a capacitor, the resistance values of the resistors 58 and 66 and capacitance values of the capacitors 51 and 52 are so determined as to make the emitter output equal to the collector output of the transistor 48. As a consequence, waveforms such as are shown by FIG. 3 (D) and (E) which have the same amplitude but are of opposite phases appear at the emitter and collector of the transistor 48.

On the other hand, a multiplied video signal is applied from the detector circuit 3 not only to the base of the transistor 56 through the capacitor 53, but also to the base of the transistor 64 through the capacitor 61. In FIG. 2, numerals 54 and 55 show resistors for applying a bias voltage to the base of the transistor 56, numeral 57 a collector resistance for the transistor 56, and numeral 58 an emitter resistance, the circuit constant of the transistor 56 being so determined that it is set in Class A amplification when the output of the bistable multivibrator 44 is zero. Numerals 62 and 63 show resistors for applying a bias to the base of the transistor 64, numeral 65 a collector resistance for the transistor 64, and numeral 66 an emitter resistance thereof. A resistor 66' is such that the emitter potential of the transistor 64 is made higher than the base potential thereof, whereby the transistor 64 is cut off when the output of the multivibrator 44 is zero. With the values of the resistors 54 and 55 of FIG. 2 appropriately selected, the transistor 56 is cut off during the positive periods from $t_8+\Delta t$ to $t_9+\Delta t$, from $t_{11}+\Delta t$ to $t_{12}+\Delta t$ and so on in the waveform FIG. 3 (D) at every other horizontal scanning period by the time $\Delta t$ behind each horizontal scanning period. In other words, during such periods, the emitter voltage of the transistor 56 becomes positive with respect to the base voltage thereof and thereby no output of the video detector circuit 3 appears at the collector of the transistor 56. During the periods when the transistor 56 is in a cut-off state, negative pulses as shown by FIG. 3 (E) are applied to the emitter of transistor 64. If the values of the resistors 62 and 63 are appropriately selected, the emitter of the transistor 64 is negative with respect to the base thereof, making the transistor 64 conduct, during the negative periods in the waveform shown in FIG. 3 (E). During the periods from $t_8+\Delta t$ to $t_9+\Delta t$, $t_{11}+\Delta t$ to $t_{12}+\Delta t$, so on, therefore, the output of the video detector 3 is produced at the collector of the transistor 64 after being amplified by the transistor 64. During the periods when the transistor 56 is cut off and the transistor 64 is conducting, a video signal of the sub channel as shown by the portion (G) of the waveform FIG. 4 is produced at the collector of the transistor 64. This signal is amplified twice by the video output circuit 19 and applied to the video tube 15 for the reception of a sub channel picture. Also, this signal is applied to the video amplifier 19 after being delayed one horizontal scanning period of 63.5 $\mu$ sec by means of the delay line. During the periods from $t_9+\Delta t$ to $t_{11}+\Delta t$, $t_{12}+\Delta t$ to $t_{13}+\Delta t$, and so on, the transistor 64 is in a cut-off state, but a video signal of the sub channel as shown by FIG. 4 (G) which is produced at the collector of the transistor 64 during the preceding periods from $t_8$ +Δt to $t_9+\Delta t$, $t_{11}+\Delta t$ to $t_{12}+\Delta t$, so on is supplied to the video amplifier 19 after being delayed 63.5 $\mu$ sec by the delay line 21. From this follows the fact that the same video signals are supplied to the video amplifier 19 for every two frames during a horizontal scanning period. One delay line is not sufficient to realize a uniform delay of 63.5 $\mu$ sec for every frequency level from 0 Hz to 4 MHz, but this is possible by using a combination of several kinds of delay lines as shown in FIGS. 5*a* and 5*b*. In these figures are shown delay characteristics which develop when using two delay lines with a band-width of 2 MHz, that is, 1 MHz ± 1 MHz and 3 MHz ± 1 MHz respectively. FIG. 5*a* shows the delay characteristics of the respective delay lines, while FIG. 5*b* show a delay characteristic after they are combined. A delay line of this kind is easily realized as is seen in a PAL type color television receiver. Transmitting the same kind of picture during two frames in this way eliminates a case in which no signal is transmitted during one scanning period.

Although the above description is in connection with the subchannel, the same holds true for the main channel except that similar operations are delayed by one horizontal scanning period. In other words, during the negative periods from $t_9+\Delta t$ to $t_{11}+\Delta t$, $t_{12}+\Delta t$ to $t_{13}+\Delta t$, and so on in the waveform shown in FIG. 4 (D), the transistor 56 is conducting and the amplified video signal of the waveform shown in FIG. 4 (H) in the main channel is produced at the collector of the transistor 56, so that after being amplified twice by the video amplifier 18 it is applied to the video tube of the main channel. As in the case of the sub channel, such a signal is delayed 63.5 $\mu$ sec by the delay line 20, and the same video signal as the preceding signal is applied to the video amplifier 18 when the transistor 56 is in a cut-off state. It will be apparent from the above that two kinds of video signals are alternately transmitted for each horizontal scanning period, which are separated after reception. A video signal of the main or sub channel in a horizontal scanning period is delayed back to a period where there is no video signal of the main or sub channel respectively, whereby such a signal is supplied again additionally to the video amplifier circuit and video tube in order to form on the video tube a better picture than if the horizontal scanning lines where reduced to half.

Consideration is given below as to how to faithfully reproduce at the receiving end the distinction made at the transmitting end between the main and sub channels. Transmitted signals contain no signal for indicating the main or sub channel clearly, and here it is assumed that a sub channel signal is always transmitted between the first horizontal synchronizing signal after a vertical blanking period, namely, $S_1$ or $S_1'$ of FIGS. 3 and 6 and the horizontal synchronizing signal $S_2$ or $S_2'$, and that a main channel signal is transmitted during the next horizontal scanning period. In FIG. 2, the output of the synchronized separator circuit 5 of the television receiver appears at the emitter of transistor 34 in the same waveform as at the base. Considering the vertical blanking period specifically, the output of the synchronized separator circuit during this period takes the same waveform as that during the vertical blanking periods in the waveforms shown in FIG. 6 (A) and (B). This waveform is produced at the emitter side of the transistor 34, and integrated by the resistor 69 and capacitor 70 of FIG. 2, producing a waveform such as shown by FIG. 6 (C) across the capacitor 70. This waveform is then applied to the base of the transistor 74 through the coupling capacitor 71. Numerals 72 and 73 show resistors for applying a bias to the base of the transistor 74, numeral 75 a collector resistance, numeral 76 an emitter resistance, and numeral 77 a resistor for biasing the emitter. If the resistance values of the resistors 72, 73, 76 and 77 are properly selected, the transistor 74 can be maintained in a cut-off state until time $t_2'$, that is, until the base voltage exceeds the emitter voltage, even when the waveform shown in FIG. 6 (C) is applied to the base of transistor 74. At this time, a waveform such as shown by FIG. 6 (D) appears at the collector of the transistor 74. This is applied through the coupling capacitor 78 to the base of the transistor 81. Numerals 79 and 80 show resistors for biasing the base of the transistor 81, whose collector current can be reduced to zero at time $t_2''$ of FIG. 6 if the resistance values of the resistors 79 and 80 are appropriately determined. In other words, the transistor 81 enters a cut-off state at time $t_2''$ when the base voltage becomes negative with respect to the emitter voltage. At time $t_3''$, the base voltage again becomes positive against the emitter voltage, and the collector current begins to flow, developing a waveform such as shown in FIG. 7 (A) in the collector of the transistor 81. Numeral 82 in FIG. 2 shows a collector resistance. A waveform as shown in FIG. 7 (B) is obtained by differentiating the waveform shown in FIG. 7 (A) by means of the capacitor 83 and resistor 84. Only positive pulses are passed to a monostable multivibrator 86 by means of the diode 85. By properly determining the metastable period of the monostable multivibrator 86, the width of its output pulse can be made as shown from $t_2'+\Delta t'$ to $t_5$ in FIG. 7 (C). Here, the time $t_5$ is set between the horizontal synchronizing signals S–2 (or S'–2) and S–3 (or S'–3), namely, between the last but two signal and the signal last but three as counted from the time $t_{11}$ when a vertical blanking period ends as shown in FIG. 6 (A) and (B). A pulse shown in FIG. 7 (C) is applied to the emitter of the transistor 40 through the capacitor 87 of FIG. 2. If the values of the resistors 38 and 39 are determined in such a manner that the emitter voltage of the transistor 40 is maintained positive against its base voltage during the period from $t_2'+\Delta t'$ to $t_5$, the transistor 40 is maintained cut-off during the same period. The result is that no output of the synchronized separator circuit 5 is applied to the bistable multivibrator 44. On the other hand, part of the output of the monostable multivibrator 86 is applied to section 88. Section 88 is constructed as shown in FIG. 8, in which the waveform FIG. 7 (C) is differentiated by the resistor 90 and capacitor 89 and transformed into the shape as shown in FIG. 9 (A). From this it is seen that only positive pulses pass through the diode 91 in order to trigger the monostable multivibrator 92. With the properly selected metastable period of the monostable multivibrator 92, the duration of its output pulse can be determined as shown from $t_2'+\Delta t'$ to $t_3$ in FIG. 9 (B), provided that the delay behind the trigger pulse is neglected. The waveform shown in FIG. 9 (B) is applied to the base of the transistor 96 through the capacitor 93 of FIG. 8. By appropriately selecting the values of the base-biasing resistors 94 and 95, the base voltage becomes positive against the emitter voltage, cutting off the transistor 96, only during the period from $t_2'+\Delta t'$ to $t_3$ when the monostable multivibrator 92 produces output pulses. Since the power is supplied to the bistable multivibrator 44 by the collector of the transistor 96, no power is supplied to the bistable multivibrator 44 while the transistor 96 is cut off. As a result, the output of the bistable multivibrator 44 becomes zero, and the transistor 56 conducts, while the transistor 64 is cut off in FIG. 2. In other words, the transistors 56 and 64 which were alternating between "on" and "off" for every other horizontal scanning period are made to conduct and cut off respectively at time $t_2'+\Delta t'$ when the transistor 40 and the power supply of the bistable multivibrator 44 are cut off, reducing the output of the bistable multivibrator 44 to zero. This condition continues until an output pulse is produced from the bistable multivibrator 44. Power is supplied to the bistable multivibrator 44 at time $t_3$, but no trigger pulse is supplied to it until time $t_5$ since the transistor 40 is maintained cut off before that time. At time $t_5$, the transistor 40 begins conducting and a horizontal synchronizing signal S–2 of FIG. 6 triggers the bistable multivibrator 44 in the case of an odd field, whereby the transistor 56 is cut off and transistor 64 conducts during the period from $t_8+\Delta t$ to $t_9+\Delta t$. In the case of an even field, the bistable multivibrator 44 is triggered by a horizontal synchronizing signal S'–2. Referring to an odd field, the output of the video detector 3 is applied to the sub channel video amplifier 19 during the period from S–2 to S–1 in FIG. 6, and to the main channel video amplifier 18 during the period from S–1 to S1. This completely agrees with the information transmitted. The same holds true for an even field. Upon entering a vertical blanking period after covering a field, the bistable multivibrator is triggered by an equalizing pulse. No special consideration is necessary for this period during which no picture is displayed on the video tubes. As described before, the output of the bistable multivibrator 44 becomes zero without fail as from time $t_2'+\Delta t'$, and therefore it is clear that the distinction between the main and sub channels at the transmitting end agrees with that at the receiving end.

As can be seen from above, in spite of a somewhat lower resolution, the television receiver according to the invention is capable of separating and displaying on separate video tubes two different kinds of video signals containing characters and figures which are transmitted in a single television wave. For this reason, the television receiver according to the invention has very great practical effect on the transmission and processing of educational information.

What is claimed is:

1. A television receiver for receiving a video carrier on which first and second video signals are carried during respective alternate horizontal scanning periods for display as different images on corresponding first and second display devices, wherein the improvement comprises switching circuit means for receiving said video carrier;

first and second video circuit means each having first and second inputs and an output, the output of said switching circuit means being coupled to the first inputs of said first and second video circuit means and the outputs of said first and second video circuit means being coupled to said first and second display devices respectively, and first and second delay means coupled between the output of said switching circuit means and the second inputs of said first and second video circuit means respectively, said switching circuit means coupling said first and second video signals to said first video circuit means and said first delay means and to said second video circuit means and said second delay means respectively during alternate horizontal scanning periods, said first delay means delaying said first video signal and coupling it to said first video circuit during the horizontal scanning period succeeding the horizontal scanning period when said first video signal was received and said second delay means delaying said second video signal and coupling it to said second video circuit during the horizontal scanning period succeeding the horizontal scanning period when said video signal was received.

2. A television receiver as defined by claim 1 wherein said first and second delay means each comprises a plurality of delay lines having different delay characteristics with respect to frequency, said first and second delay means delaying said first and second video signals over the substantially entire frequency range thereof.

3. A television receiver as defined by claim 1 wherein said video carrier further carries vertical and horizontal synchronizing signals and wherein said switching circuit means comprises a bistable multivibrator having first and second output states, first and second switching elements coupling the output of said bistable multivibrator to the first inputs of said first and second video circuit means and to said first and second delay means respectively during successive horizontal scanning periods, switching means having a first input for coupling said vertical synchronizing signals to the input of said bistable multivibrator, and a mono stable multivibrator receiving said vertical synchronizing signals, the output of said monostable multivibrator being coupled to a second input of said switching means for preventing synchronizing pulses from being applied to said bistable multivibrator for a predetermined portion of the vertical blanking period thereby maintaining the output of said bistable multivibrator in a first state during that portion of the vertical blanking period and causing said first switching element to conduct and said second switching element to be nonconductive.

4. A television receiver as defined by claim 3 which further comprises integrating, amplifying and shaping circuit means for coupling said synchronizing signals to said monostable multivibrator.

5. A television receiver as defined by claim 3 which further comprises means coupling said monostable multivibrator to said bistable multivibrator for deenergizing said bistable multivibrator during a part of said predetermined portion of said vertical blanking period and maintaining the output of said bistable multivibrator in said first state, output pulses being produced by said bistable multivibrator starting from a predetermined horizontal synchronizing signal preceding the end of the vertical blanking period.

6. A television receiver as defined by claim 5 which further comprises integrating, amplifying and shaping circuit means for coupling said synchronizing signals to said monostable multivibrator.

7. A television receiver as defined by claim 1 which further comprises an audio signal system for receiving, separating and reproducing separately multiplexed audio signals.

* * * * *